(12) United States Patent
Davey

(10) Patent No.: US 6,212,523 B1
(45) Date of Patent: Apr. 3, 2001

(54) SYSTEM AND METHOD FOR ALTERING TIME FRAME OF DATE DEPENDENT INFORMATION FEATURING A MAIN DATABASE FOR STORING INFORMATION EXCLUSIVELY IN LOCAL TIME

(76) Inventor: Philip Davey, 2 Tattershall Close, Shenley Church End, Milton Keynes MK5 6EZ (GB)

(*) Notice: Subject to any disclaimer, the term of this patent is extended or adjusted under 35 U.S.C. 154(b) by 0 days.

(21) Appl. No.: 09/001,670

(22) Filed: Dec. 31, 1997

(30) Foreign Application Priority Data

Aug. 13, 1997 (GB) .................................................. 9717193

(51) Int. Cl.[7] .................................................. G06F 17/30
(52) U.S. Cl. ........................ 707/101; 707/102; 707/104
(58) Field of Search ................................ 707/101, 102, 707/104

(56) References Cited

U.S. PATENT DOCUMENTS

| | | | |
|---|---|---|---|
| 5,600,836 | * | 2/1997 | Alter ...................................... 395/612 |
| 5,878,422 | * | 3/1999 | Roth et al. ............................ 707/100 |
| 5,897,633 | * | 4/1999 | Nolan ........................................ 707/6 |

FOREIGN PATENT DOCUMENTS

97/16795   5/1997   (WO) .

* cited by examiner

Primary Examiner—Thomas G. Black
Assistant Examiner—William Trinh
(74) Attorney, Agent, or Firm—Dykema Gossett PLLC

(57) ABSTRACT

A Year 2000 compliant computer system comprises a master data base maintained in local time without conversion, a processor for running stored programs on the basis of a zone time different to local time, and at least one time change interface which will convert the date data obtained from the master data base from local time to zone time and vice versa in order to maintain the master data base in local time.

3 Claims, 1 Drawing Sheet

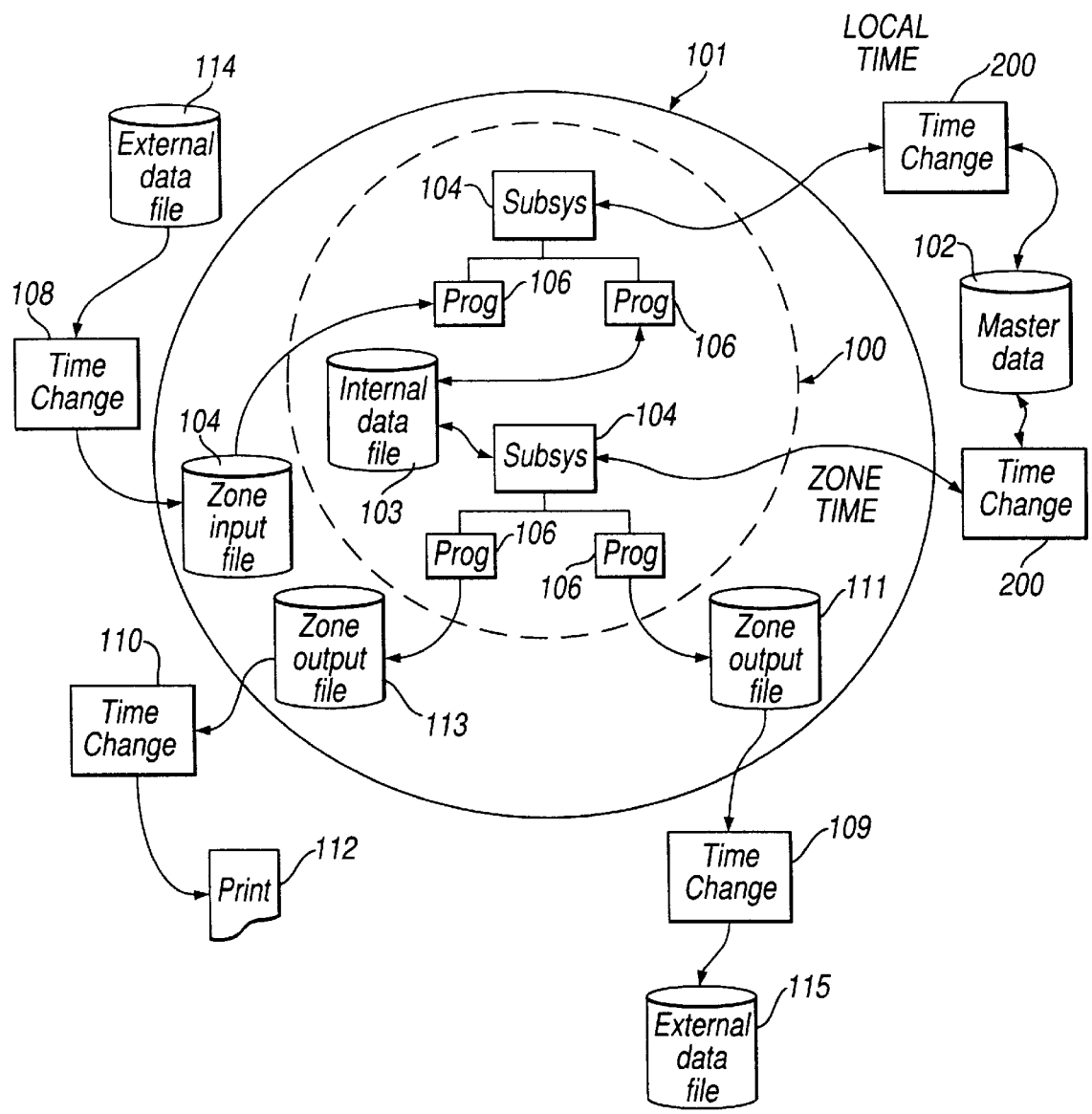

SYSTEM AND METHOD FOR ALTERING TIME FRAME OF DATE DEPENDENT INFORMATION FEATURING A MAIN DATABASE FOR STORING INFORMATION EXCLUSIVELY IN LOCAL TIME

BACKGROUND TO THE INVENTION

The present invention relates to a system and method for altering the time frame of date dependent information.

The need to alter the time frame of date dependent information has become apparent with the need to achieve Year 2000 compliance. A number of proposals have been made to deal with the way in which Year 2000 compliance can be achieved and one proposal is set out in U.S. Pat. No. 5,600,836 where it is proposed that date data in local time (real time) should be converted to zone time in a time change interface so that all of the dates are in one century. Once the dates are in zone time the computer program application processes the date data in zone time instead of local time and after processing the data is reconverted by a time change interface from zone time to local time. In this way, a user is presented with information in local time and can enter data in local time but the computer operates in the zone time in order to avoid problems which arise if the systems are not Year 2000 compliant.

A particular problem arises if one is looking at a computer system which has a very large database containing date dependent information. In U.S. Pat. No. 5,600,836, it is proposed that when there is a database present, the date data in the database is converted in advance to zone time. While this is technically possible, it is not a practical proposition when dealing with very large databases in view of the fact that the computer system has to be taken off-line while the database is being converted and the computer may be off-line for a considerable period of time, even days. For most organizations having large databases this is not feasible and a different solution has to be used.

Another approach to the problem of Year 2000 compliance has been to maintain the database information unaltered but to re-write the application programs to take account of Year 2000 problems. This is an extremely expensive and time consuming operation and is not thought to be an appropriate solution.

BRIEF DESCRIPTION OF THE INVENTION

The present invention proposes to deal with the Year 2000 compliance by maintaining the database in local time without conversion, maintaining the programs largely unaltered and to provide a time change interface which will convert the date data obtained from the database from local time into zone time and vice versa in order to maintain the database in local time.

The advantage of this arrangement is that the database does not require conversion, can be used immediately, and after the Year 2000 does not need to be converted back.

Preferably the time change units have a switch facility so that they can be switched on or off as desired and this has the advantage also that after the Year 2000 has passed, all that need happen is that the time change interface can be switched off and computer time brought up to local time.

BRIEF DESCRIPTION OF THE DRAWING

In order that the present invention be more readily understood, an embodiment thereof will now be described with reference to the accompanying drawing which shows a diagrammatic representation of a computer system according to the present invention.

DESCRIPTION OF THE PREFERRED EMBODIMENT

One way of understanding the present invention is to start from the disclosure of U.S. Pat. No. 5,600,836 and attention is directed to this disclosure which is incorporated herein by way of reference. For ease of reference, the present invention uses a modified version of FIG. 1 of the U.S. patent document with the same reference numerals as used in the U.S. document and consequently this will not be described in detail.

The difference between the present invention and the arrangement disclosed in U.S. Pat. No. 5,600,836 is that main database 102 is not included in the zone time area 101 of the computer system. In the present invention, the main database 102 communicates with the computer system 101 via a time change interface 200. In the attached diagram, a separate time change interface 200 is provided for each subsystem. However, a time change interface 200 could be shared by a number of subsystems 104 as is disclosed in the U.S. patent document.

The construction of a time change interface is also disclosed in the U.S. document and will not be repeated here.

To sum up, the present invention maintains the integrity of the database in local time. It also maintains the programs in substantially unaltered form except for the computer system time or the so-called zone time. This is altered in the manner described in the U.S. patent by simply altering the system date to an appropriate time in a time period either before or after the Year 2000. This in turn means that substantial alteration of the programs with the consequent risk of introducing errors into the programs is avoided. Thus the burden of conversion and down time due to modifying the database is avoided as is the risk of program errors. Also, when the year 2000 problem is past there is no need for reconversion of the database to remove modifications and as the programs are also unaltered there is no need for further programming. The time change interface can simply be ignored or switched off.

What is claimed is:

1. A computer system for altering the time frame of date dependent information in a selected information format, the system comprising a main data base maintained exclusively in local time for storing information in local time, a processor for processing data in a zone time different from local time, means for retrieving information in local time from the main data base, means for converting the retrieved information from local time into zone time without changing the information format and supplying the information in zone time to the processor, means for receiving processed information in zone time from the processor and converting the processed information into local time without changing the information format, and means for writing the processed information in local time into the main data base, whereby the system contains no image of the main database maintained in zone time.

2. A computer system according to claim 1, wherein the means for converting the retrieved information and the means for receiving and converting the processed information are provided with switch means for inhibiting their operation, and wherein the computer system is brought into local time.

3. A computer system according to claim 1, and comprising further means for receiving processed information in zone time from the processor and for converting the processed information into local time, and farther means for storing the processed and converted data in a further data base.

* * * * *